Figure 1:
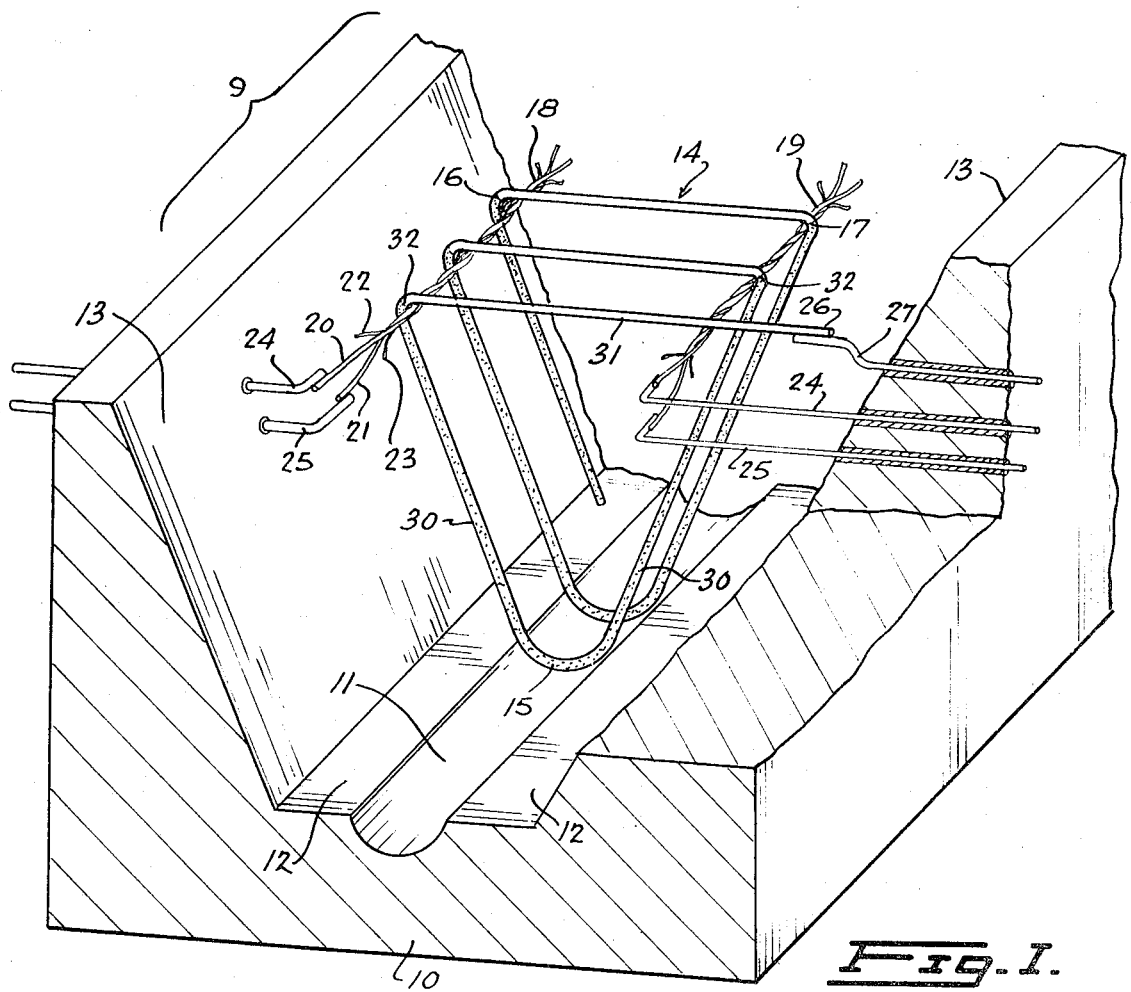

United States Patent

Malcolm

[15] 3,689,824
[45] Sept. 5, 1972

[54] CIRCUIT FOR CONVERSION FROM (RMS) A.C. TO D.C.

[72] Inventor: Ian Malcolm, Smiths Falls, Ontario, Canada

[73] Assignee: Guildline Instruments Limited, Smiths Falls, Ontario, Canada

[22] Filed: Aug. 30, 1971

[21] Appl. No.: 176,192

[52] U.S. Cl. ................ 321/1.5, 324/105, 324/106, 328/144
[51] Int. Cl. ............................................. H02m, G01r
[58] Field of Search ............... 321/1.5; 324/105, 106; 328/144

[56] References Cited

UNITED STATES PATENTS

| | | |
|---|---|---|
| 3,435,319 | 3/1969 | Richman ................ 321/1.5 |
| 3,488,573 | 1/1970 | Cavigelli et al. ............ 321/1.5 |
| 3,521,164 | 7/1970 | Richman ................ 324/106 |
| 3,624,525 | 11/1971 | Smith ................ 324/106 |

*Primary Examiner*—William H. Beha, Jr.
*Attorney*—Peter Kirby et al.

[57] ABSTRACT

A multijunction thermal convertor of the differential type is employed to obtain energy balance between a D.C. input voltage and an A.C. input voltage in order to determine the RMS value of the A.C. voltage. Amplified feedback from the output of the convertor is used to maintain this balance, by controlling the gain of an amplifier in the A.C. input. The value of this gain in relation to the D.C. input voltage is a measure of the desired (RMS) A.C. input voltage, and such value is expressed as a D.C. output voltage. The system has greater accuracy than previous systems for achieving a similar measurement.

4 Claims, 2 Drawing Figures

PATENTED SEP 5 1972

3,689,824

CIRCUIT FOR CONVERSION FROM (RMS) A.C. TO D.C.

This invention relates to a circuit for converting A.C. to D.C., in which a D.C. output voltage provides an accurate measure of the RMS value of an A.C. input voltage, the circuit employing a thermal A.C./D.C. convertor of the multijunction type.

The multijunction thermal convertor was first developed by F.J. Wilkins and described both in his British Pat. Nos. 1,089,781 and 1,089,966, both published Nov. 8, 1967, (equivalent U.S. Pat. Nos. 3,381,368 and 3,382,108 both issued May 7, 1968) and in an article by F.J. Wilkins et al. entitled "Multijunction Thermal Convertor" published in the Proceedings I.E.E. Vol. 112, No. 4, Apr., 1965, at page 794 et seq.

In my U.S. Pat. application Ser. No. 878,526 filed Nov. 20, 1969, there is described a multijunction thermal A.C./D.C. convertor consisting of a helix of resistive wire, the helix having a triangular cross section and the wire being copper plated on two sides of the helix to form two rows of thermo-electric junctions. One of the forms of convertor disclosed in said application is of the differential type in which a pair of heater assemblies (which also form support elements) each extend along a respective one of two apices of the helix to heat respective rows of the thermoelectric junctions. The third apex of the helix is smoothly curved, the turns of the helix at this third apex being adhesively secured to a complementarily shaped recess in a heat sink. Assuming symmetry, equal power supplied to each heater will generate zero output from the helix as a whole, since the voltages generated by the two rows of thermo-electric junctions balance each other.

The object of the present invention is to provide a circuit using a convertor, preferably one of this differential multijunction type, the system to function as an A.C. to D.C. transformer with true RMS response, and with greater accuracy than that obtainable from currently available devices.

Further objects of the preferred form of the invention are to provide such a circuit having a high input impedance, together with fast and convenient operation.

Figure 2:
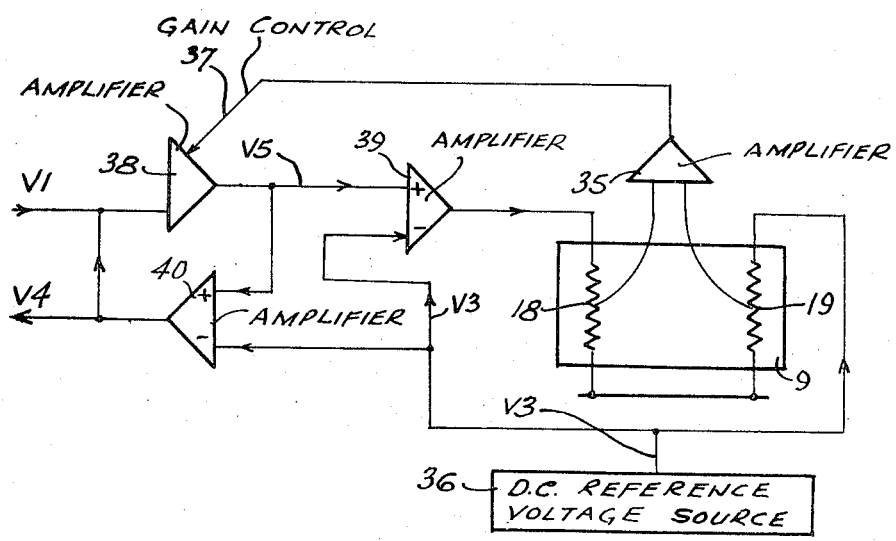

A manner of carrying the invention into practice is illustrated diagrammatically in the accompanying drawings, in which:

FIG. 1 shows a perspective view of a fragment of a thermal, multijunction convertor; and FIG. 2 illustrates a conversion circuit constructed according to the present invention.

The convertor 9 shown in FIG. 1 is of the type disclosed in my said prior patent application. An elongated aluminum mount 10 is formed with a central, part cylindrical recess 11, flat surfaces 12 on each of the recess 11, and inclined sides 13. A helix 14 of relatively high resistance (Constantan) wire has a lower apex 15 that complements the shape of the recess 11 and is secured within this recess by an adhesive. Two upper apices 16 and 17 of the helix are supported by heater assemblies 18 and 19 respectively. While these heater assemblies may take different forms, each preferably consists of a bifilar heater wire having two portions 20 and 21 twisted together and a bifilar thermal wire having two portions 22 and 23 intertwined with each other and with the heater wire portions 20 and 21. The heater wire portions will preferably be of Manganin (Mn-12%; Ni-4%; Cu-84%) and the thermal wire portions of copper, both being coated with a suitable enamel to obtain the necessary electrical insulation, while maintaining close thermal contact between the wires. The function of the thermal wire portions is to enhance the temperature uniformity of each heater assembly along its length. At the far end of each heater assembly, not shown in FIG. 1, the heater wire portions are looped together so that current introduced into the portion 20 from a lead 24 will flow the length of the assembly and back along the heater wire portion 21 to the lead 25.

The end 26 of the helix 14 is soldered to a lead 27, and a similar lead is connected to the remote end of the helix (not shown). The helix will typically have about 200 turns of wire, these turns being carefully wound with uniformed spacing from each other. They must not touch each other, as this wire bears no insulation.

Portions 30 of each turn of the helix are coated (plated) with a low resistant metal, such as copper, and the portion 31 of each turn is uncoated. The plated portions of the helix are shown stippled in the drawing, for ease of illustration. It will be apparent that the copper surface layers of the plated portions 30 effectively short circuit the portions of the high resistance helix beneath them and form with the unplated portions 31 a row of thermo-electric junctions 32, such rows being in intimate thermal contact with the heater assemblies 18 and 19, respectively. The mount 10 acts as a heat sink.

If the two heater assemblies 18 and 19 are heated identically, i.e. by the same power, the voltages generated in the two rows of junctions balance so that there is no voltage output across the two ends of the helix.

In FIG. 2, the convertor 9 is shown in diagrammatic form, the heater 18 being heated by an alternating current input voltage. The output of the helix of the convertor 9 is fed to an amplifier 35 of very high (theoretically infinite) gain. The D.C. powered heater 19 is supplied with a voltage V3 from a D.C. reference voltage source 36, the voltage applied to the A.C. heater 18 being adjusted to achieve balance in the convertor 9. To achieve this effect the output of the amplifier 35 is connected to the gain control 37 of an input amplifier 38 that receives the input A.C. voltage V1, the output of the amplifier 38 passing through a further (unity gain) amplifier 39 to the heater 18. This arrangement ensures that the amplifier 35 always drives the gain control of the amplifier 38 in such a way as to cause equivalent heating effects in the heaters 18 and 19. The ratio between the input voltage V1 and the reference voltage V3 is then equal to the gain G of the amplifier 38. If this gain can be determined, in relation to the reference voltage V3, the RMS value of the input voltage V1 will be known.

The amplifier 38 is a phase compensated amplifier giving equal A.C. and D.C. gain. This gain can therefore be found by injecting a D.C. voltage into the input of the amplifier 38 and measuring the resulting D.C. level at its output. This D.C. output component must, however, be removed before the voltage is applied to the heater 18. In practice, the D.C. output voltage component is kept constant, while the D.C. input is allowed to vary. This is accomplished by using a feedback loop incorporating an amplifier 40 which ideally has infinite D.C. gain and infinite A.C. rejection. If the D.C. voltage V3 is applied as a negative input of the amplifier 40, and the output V4 of this amplifier 40 is fed back into the input of the amplifier 38, the D.C. component of the output V5 of the amplifier 38 must come to equal V3, since infinite D.C. gain exists around the loop and the net D.C. input to the amplifier 40 must therefore be zero. Thus, the gain G of the amplifier 38 equals V3/V4. The D.C. component of the output V5 of the amplifier 38, i.e. V3, is now subtracted at a second input of the amplifier 39, thus ensuring that only the A.C. component of V5 is applied to the heater 18.

As has been noted above,

V1 (RMS) = V3/G
= V3 (V4/V3)
= V4

It will be noted that the accuracy is independent of V3, and that a D.C. output voltage V4 is obtained numerically equivalent to the RMS value of the A.C. input voltage V1.

It should be noted that the gain G' of the amplifier 39 need not necessarily be unity. This is merely a convenience to obtain direct reading at the output voltage V4. In the general case, V4 = G' V1 (RMS), in which case V4 corresponds to V1 (RMS) in the sense of being proportional thereto rather than exactly equivalent thereto.

I claim:

1. A circuit for conversion of an (RMS) A.C. input voltage to a corresponding D.C. output voltage, comprising:
    a. a convertor having a D.C. input, an A.C. input, and an output representative of a difference between a D.C. voltage applied to said D.C. input and the RMS value of an A.C. voltage applied to said A.C. input,
    b. means or connecting said D.C. input to a D.C. reference voltage,
    c. amplifier means including variable gain control means,
    d. means connecting the output of said amplifier means to said A.C. input of the convertor,
    e. means for connecting an input of said amplifier means to the A.C. input voltage to be converted,
    f. means connecting said output of the convertor to said gain control means to vary the same to bring said convertor output to zero, and
    g. means for determining the ratio between the gain of said gain control means and the value of said D.C. reference voltage including means for expressing said ratio as a D.C. output voltage to provide a measure of the RMS value of said A.C. input voltage to be converted.

2. A circuit according to claim 1, wherein said means (g) comprise a feed-back loop for determining said gain as a value independent of said D.C. reference voltage.

3. A circuit for conversion of an (RMS) A.C. input voltage to a corresponding D.C. output voltage, comprising:
    a. a convertor having a D.C. input, and A.C. input, and an output representative of a difference between a D.C. voltage applied to said D.C. input and the RMS value of an A.C. voltage applied to said A.C. input,
    b. means for connecting said D.C. input to a D.C. reference voltage,
    c. a first amplifier including variable gain control means and having equal A.C. and D.C. gain,
    d. means for connecting an input of said amplifier to the A.C. input voltage to be converted,
    e. a high gain D.C. amplifier including means for connecting a first input thereof to said D.C. reference voltage, means connecting the output thereof to an input of said first amplifier, and means connecting the output of said first amplifier to a second input of said high gain amplifier, said first and second inputs of the high gain amplifier being of opposite polarity,
    f. a further amplifier of predetermined gain, including means connecting a first input thereof to the output of said first amplifier, means connecting the output thereof to said A.C. input of the convertor, and means for connecting a second input thereof to said D.C. reference voltage, said first and second inputs of the further amplifier being of opposite polarity,
    g. and means connecting said output of the convertor to said gain control means to control the same to bring said convertor output to zero and hence cause the output of said high gain D.C. amplifier to provide a D.C. output voltage proportional to the RMS value of said A.C. input voltage to be converted.

4. A circuit according to claim 3, wherein the gain of said further amplifier is unity, whereby said D.C. output voltage is numerically equivalent to the RMS value of said A.C. input voltage to be converted.

* * * * *